US012768256B2

(12) United States Patent
Alharbi

(10) Patent No.: US 12,768,256 B2
(45) Date of Patent: Oct. 20, 2026

(54) PERFORMING HYDRAULIC FRACTURING TREATMENTS IN HYDROCARBON BEARING FORMATIONS WITH NO STRESS BARRIERS

(71) Applicant: Saudi Arabian Oil Company, Dhahran (SA)

(72) Inventor: Moataz Mohammad Alharbi, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 30 days.

(21) Appl. No.: 18/519,579

(22) Filed: Nov. 27, 2023

(65) Prior Publication Data

US 2024/0218775 A1 Jul. 4, 2024

Related U.S. Application Data

(60) Provisional application No. 63/436,027, filed on Dec. 29, 2022.

(51) Int. Cl.
*E21B 43/267* (2006.01)
*C09K 8/80* (2006.01)

(52) U.S. Cl.
CPC ............ *E21B 43/267* (2013.01); *C09K 8/805* (2013.01)

(58) Field of Classification Search
CPC .......... E21B 43/267; C09K 8/805; C09K 8/80
See application file for complete search history.

(56) References Cited

U.S. PATENT DOCUMENTS

| | | | | | |
|---|---|---|---|---|---|
| 2,265,962 | A | | 12/1941 | Bent et al. | |
| 4,476,931 | A | | 10/1984 | Boles et al. | |
| 4,478,282 | A | * | 10/1984 | Nolte | E21B 43/267 166/308.1 |
| 4,718,490 | A | | 1/1988 | Uhri | |
| 4,887,670 | A | * | 12/1989 | Lord | E21B 43/267 166/308.1 |
| 5,159,979 | A | * | 11/1992 | Jennings, Jr. | C09K 8/62 166/308.2 |
| 5,228,510 | A | | 7/1993 | Jennings, Jr. et al. | |

(Continued)

OTHER PUBLICATIONS

Almond, "Fracking and aquifers: how far up can a frack go?," Refine—Researching Fracking in Europe, 2012, 2 pages.

(Continued)

*Primary Examiner* — Crystal J Lee
(74) *Attorney, Agent, or Firm* — Fish & Richardson P.C.

(57) ABSTRACT

Systems and methods of fracturing a formation lacking natural stress barriers are disclosed. The systems and methods include introducing a low-permeability solids mixture into a target formation; introducing a pad into the target formation to form a fracture and sweep or distribute the solids mixture within the target formation. The distributed solids mixture interacts with the target formation to form in-situ barriers within the target formation. The in-situ barriers limit an amount of fracture height growth. A primary proppant stage is applied the target formation to increase conductivity of the formation and increase a width of the fracture. Introduction of the solids mixture, the pad, and a primary proppant introduced during the primary proppant stage are introduced into the target formation at the same location or locations within the target formation.

15 Claims, 11 Drawing Sheets

(56) References Cited

U.S. PATENT DOCUMENTS

| | | | | |
|---|---|---|---|---|
| 6,169,058 | B1 * | 1/2001 | Le | C09K 8/62 507/224 |
| 7,644,761 | B1 | 1/2010 | Gu et al. | |
| 2021/0024807 | A1 * | 1/2021 | Vidma | E21B 43/261 |

OTHER PUBLICATIONS

Bedaiwi et al., "Polymer Injection for Water Production Control through Permeability Alteration in Fractured Reservoir," NAFTA, 2009, 60(4):221-231, 11 pages.

Rabiei, "Excess Water Production Diagnosis in Oil Fields Using Ensemble Classifiers," Thesis for the degree of Doctor of Philosophy of Curtin University, Oct. 2011, 121 pages.

* cited by examiner

520

| Job Description | | | | | | | | | | | |
|---|---|---|---|---|---|---|---|---|---|---|---|
| Part | Step Name | Pump Rate (bbl/min) | Fluid Name | Step Fluid Volume (gal) | Gel Conc. (lb/mgal) | Prop. Type and Mesh | Prop. Conc. (PPA) | Hydrostatic Pressure (psi) | Slurry Density (lbmlgal) | Time (min) |
| 1 | Pad | 30 | Cross-Linked Gel | 13000 | 40 | None | 0 | 5728 | 8.43 | 10.32 |
| | 0.5 PPA | 30 | Cross-Linked Gel | 9000 | 40 | 40/70 Sand | 0.5 | 5937 | 8.75 | 7.29 |
| | 1.0 PPA | 30 | Cross-Linked Gel | 16000 | 40 | 40/70 Sand | 1 | 6134 | 9.05 | 13.23 |
| | 2.0 PPA | 30 | Cross-Linked Gel | 21000 | 40 | 40/70 Sand | 2 | 6500 | 9.59 | 18.12 |
| 2 | Pad | 30 | Cross-Linked Gel | 15000 | 40 | None | 0 | 5728 | 8.43 | 11.90 |
| | 0.5 PPA | 30 | Cross-Linked Gel | 6000 | 40 | 30/50 Proppant | 0.5 | 5964 | 8.75 | 4.84 |
| | 1.0 PPA | 30 | Cross-Linked Gel | 8000 | 40 | 30/50 Proppant | 1 | 6199 | 9.15 | 6.57 |
| | 2.0 PPA | 30 | Cross-Linked Gel | 10000 | 35 | 30/50 Proppant | 2 | 6644 | 9.80 | 8.48 |
| | 2.5 PPA | 30 | Cross-Linked Gel | 10000 | 35 | 30/50 Proppant | 2.5 | 6853 | 10.05 | 8.61 |
| | 3.0 PPA | 30 | Cross-Linked Gel | 10000 | 35 | 30/50 Proppant | 3 | 7062 | 10.40 | 8.72 |
| | 3.5 PPA | 30 | Cross-Linked Gel | 10000 | 35 | 30/50 Proppant | 3.5 | 7258 | 10.74 | 8.86 |
| | 4.0 PPA | 30 | Cross-Linked Gel | 10000 | 35 | 30/50 Proppant | 4 | 7454 | 10.94 | 8.99 |
| | 4.5 PPA | 30 | Cross-Linked Gel | 6000 | 35 | 30/50 Proppant | 4.5 | 7638 | 11.25 | 5.47 |
| | Flush | 30 | Linear Gel | 10408 | 15 | None | 0 | 5728 | 8.43 | 8.26 |

522, 524, 526, 528, 530, 532, 634, 536, 541, 542

FIG. 6

PERFORMING HYDRAULIC FRACTURING TREATMENTS IN HYDROCARBON BEARING FORMATIONS WITH NO STRESS BARRIERS

CROSS REFERENCE TO RELATED APPLICATIONS

This application claims the benefit of U.S. Provisional Application Ser. No. 63/436,027, filed on Dec. 29, 2022, the entire contents of which are incorporated herein by reference in their entirety.

TECHNICAL FIELD

This disclosure relates to hydraulic fracturing techniques and, more particularly, to hydraulic fracturing techniques for unconfined hydrocarbon-bearing formations.

BACKGROUND

In some cases, hydrocarbon-bearing target formations do not have stress barriers to keep a hydraulically-formed fracture confined within the target formation. The fracture may grow in height out of the target formation and compromise the integrity of the fracture. Further, proppant used during the fracturing treatment may be pushed out of the target formation and into non-productive zones. With the proppant distributed over a larger area, conductivity of the fracture is reduced, and a smaller fracture width may result. As a result, the fracture may have a narrow width with less conductivity compared to a hydraulically formed fracture confined within a target formation having stress barriers in which a tip screen out could be utilized. Such a narrow fracture may negatively affect well productivity, and the resulting well may not achieve commercial production rate.

SUMMARY

An aspect of the present disclosure includes a method for increasing a fracture width of a hydraulic fracture formed in a target formation lacking natural stress barriers. The method may include introducing a low-permeability solids mixture into a target formation via a well; introducing a pad into the target formation via the well; forming a fracture in the target formation and distributing the low-permeability solids mixture into the target formation with the injected pad; introducing a primary proppant into the fracture via the well; and enlarging a width of the fracture with the introduction of the primary proppant into the fracture. The low-permeability solids mixture may interact with the target formation to change a localized permeability of the target formation at a peripheral edge of the fracture and limit a height of the fracture. The primary proppant may maintain the fracture in an open condition.

The low-permeability solids mixture, the pad, and the primary proppant may be introduced into the target formation at the same location within the well. An interval of the well may be perforated at a location along the well. The low-permeability solids mixture, the pad, and the primary proppant may be introduced into the target formation at the perforated interval of the well. The low-permeability solids mixture may include a low-quality proppant or sand having at least one of poor roundness, poor sphericity, low strength, or a mixture of sizes. The low-permeability solids mixture may include a secondary proppant having a mesh size within a range of 140-12 mesh The primary proppant may include a gritty material with uniform size and sufficient strength to keep the fracture open such as natural sand or man-made proppant such as sintered bauxite. In some cases, materials used as primary proppant include 70/40 mesh sand, 70/40 mesh sintered bauxite, 30/50 mesh sand, 30/50 mesh sintered bauxite, 20/40 mesh sand, 20/40 mesh sintered bauxite, 16/30 mesh sand and 16/30 mesh sintered bauxite and other sizes as applicable for the fracturing operation. The sand and sintered bauxite can be resin coated. The target formation may lack natural stress barriers at one or more boundaries of the target formation.

In one aspect, a method for increasing a fracture width of a hydraulic fracture formed in a target formation lacking natural stress barriers includes introducing a low-permeability solids mixture into the target formation via a well; introducing a pad into the target formation via the well; forming a fracture in the target formation and distributing the low-permeability solids mixture into the target formation with the injected pad, the low-permeability solids mixture interacting with the target formation to change a localized permeability of the target formation at a peripheral edge of the fracture and limiting a height of the fracture; introducing a primary proppant into the fracture via the well; and enlarging a width of the fracture with the introduction of the primary proppant into the fracture, the primary proppant maintaining the fracture in an open condition.

Embodiments of these aspects can include one or more of the following features.

In some embodiments, the low-permeability solids mixture, the pad, and the primary proppant are introduced into the target formation at the same location within the well.

In some embodiments, the aspects further include perforating an interval of the well at a location along the well.

In some embodiments, the low-permeability solids mixture, the pad, and the primary proppant are introduced into the target formation at the perforated interval of the well.

In some embodiments, the low-permeability solids mixture includes a secondary proppant having a mesh size within a range of 140-12 mesh.

In some embodiments, the low-permeability solids mixture includes a low-quality proppant or sand having at least one of poor roundness, poor sphericity, low strength, or a mixture of sizes.

In some embodiments, the primary proppant includes at least one of 70/40 mesh sand, 70/40 mesh sintered bauxite, 30/50 mesh sand, 30/50 mesh sintered bauxite, 20/40 mesh sand, 20/40 mesh sintered bauxite, 16/30 mesh sand and 16/30 mesh sintered bauxite. In some cases, the sand and sintered bauxite are resin coated.

In some embodiments, the primary proppant includes a high-quality natural sand or proppant with a mesh size between 30 and 50.

In some embodiments, the target formation includes a formation lacking natural stress barriers at one or more boundaries of the target formation.

The details of one or more implementations of the present disclosure are set forth in the accompanying drawings and the description that follows. Other features, objects, and advantages of the present disclosure will be apparent from the description and drawings, and from the claims.

DESCRIPTION OF DRAWINGS

FIG. 6 is an example pumping schedule according to some implementations of the present disclosure.

Like reference symbols in the various drawings indicate like elements.

DETAILED DESCRIPTION

The present disclosure describes an approach to improving a width of a fracture within a target formation formed during a hydraulic fracturing treatment where the target formation is unconfined, that is, the target formation does not include stress barriers. In order to prevent uncontrolled growth of the height of the fracture out of the target formation during the fracturing treatment, a hydraulic fracturing treatment may involve introducing a layer of low-permeability solids into the non-productive zones disposed adjacent to the target zone.

Figure 1:
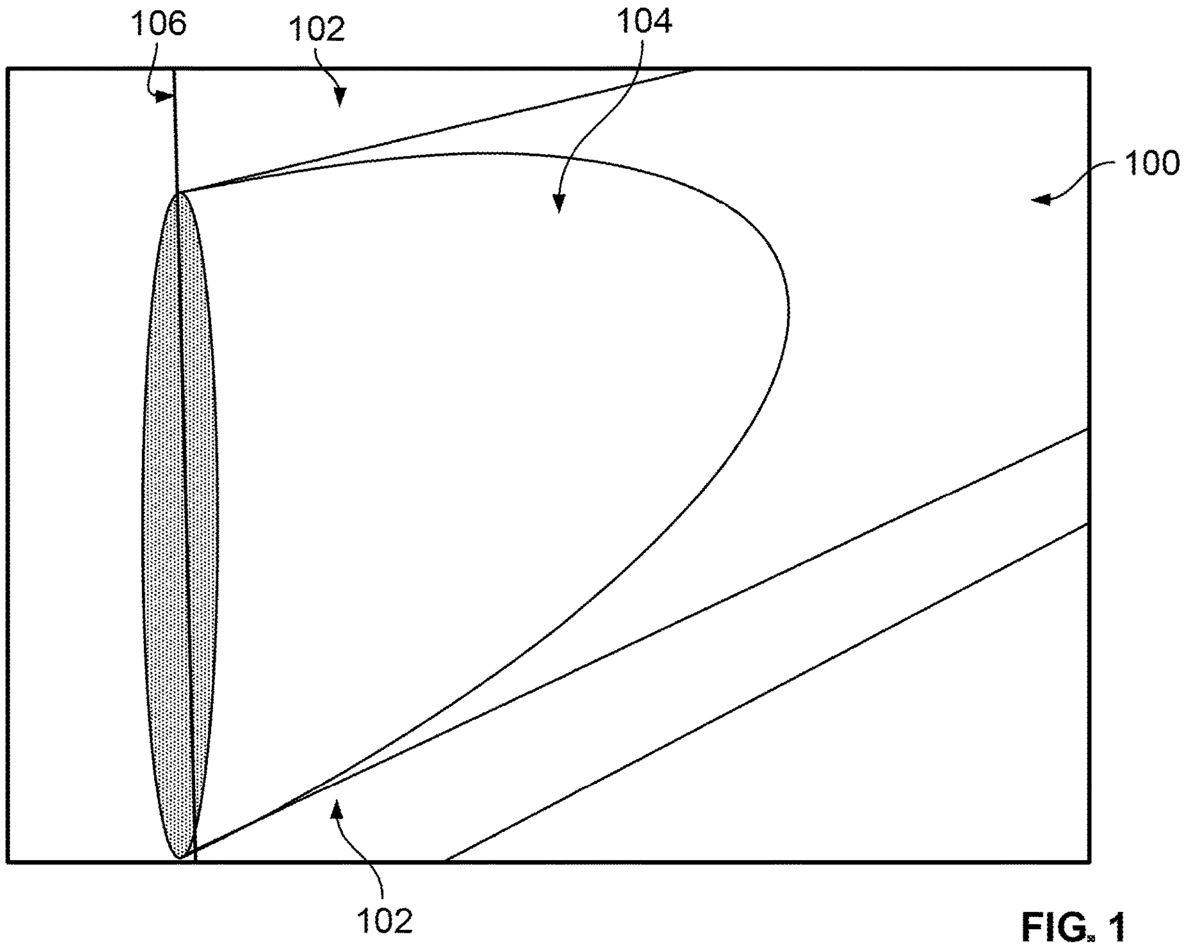
FIG. 1 is a view showing a fracture extending into a formation bounded by stress barriers, according to some implementations of the present disclosure.

FIG. 1 shows a target formation 100 that has adjacent stress barriers 102 disposed both vertically above (or uphole) and vertically below (or downhole) of the target formation 100. The stress barriers 102 limit an amount by which a height of a fracture 104 propagated from a vertical well 106 is permitted to grow. That is, the stress barriers 102 prevent the fracture 104 from growing into zones vertically adjacent to the target formation 100. Although a vertical well 106 is illustrated, the scope of the present disclosure is applicable to other types of wells, such as slant wells, articulated well, and horizontal well.

Figure 2A:
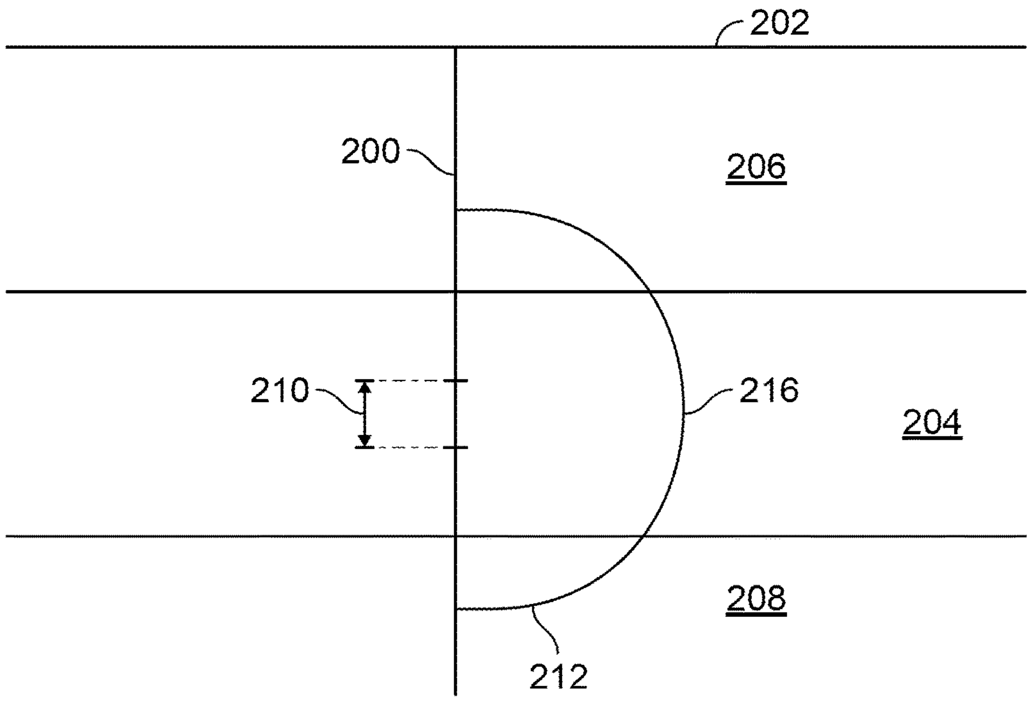
FIGS. 2A-2B are cross-sectional views of a formation that lacks bordering stress barriers, according to some implementations of the present disclosure.
Figure 2B:
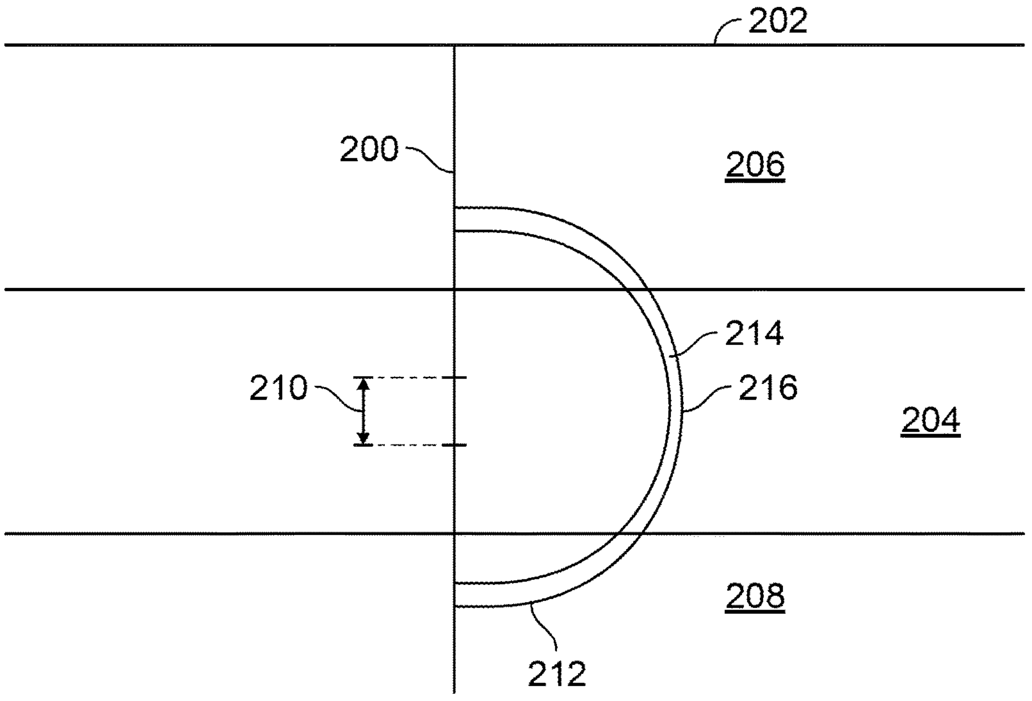

FIGS. 2A and 2B show a target formation in which no stress barriers exist between the target formation and adjacent zones. Particularly, FIGS. 2A-2B show a vertical well 200 extending form the surface 202. The well 200 extends through a target formation 204, a first non-productive zone 206 disposed uphole of the target formation 204, and a second non-productive zone 208 disposed downhole of the target formation 204. In this instance, there are no stress barriers disposed between the target formation 204 and the first and second non-productive zones 206 and 208. A perforation zone 210 is shown extending along a length of the well 200.

In FIG. 2A, with the target formation 204 perforated, a hydraulic fracturing operation may be performed. A fracture 212 can extend radially into the adjacent non-productive zones 206 and 208 with reduced fracture width The methods of this disclosure can improve the fracture conductivity by increasing the fracture width. While the fracture width is being increased, the fracture height can still grow into the adjacent non-productive zones, before coming to rest. In conventional proppant fracturing, the fracture width cannot be increased significantly without the presence of stress barriers to confine the growth of the fracture length or height. In the conventional fracture, attempting to increase the fracture width by increasing the proppant amount will distribute the proppant in a larger area of the subsurface formation since the fracture will continue to grow in height and length. The resultant fracture width is still small. In some implementations, there may be stress variations present in the subsurface formation between the primary target 204 and the adjacent non-productive zones 206 and 208. If the stress variation between the target formation 204 and the non-productive zones is small, the fracture height can exceed the primary zone height and extend into the non-productive zones. In these cases, there are effectively no stress barriers present, and the techniques of this disclosure can be applied.

FIG. 2B shows a cross-sectional view of a fracture in a formation with no stress barriers between the target formation 204 and adjacent non-productive zones 206 and 208. To increase a fracture width and reduce a fracture height, a fracturing treatment can be applied to halt the fracture from extending radially into the adjacent non-productive zones 206 and 208. The fracture treatment includes pumping a pad stage followed by a low-permeability solids mixture into the target formation 204, followed by a second pad, and then followed by the primary proppant fracture treatment. Applying this technique can increase the fracture width in the range of 1-200%. Example constraints that may limit the increase in the fracture width is the maximum allowable treating and bottomhole pressures, or if the impermeable solid mixture pack can no longer restrict the fracture height growth. Any increase in the fracture width over the conventional proppant fracture can result in increased fracture conductivity.

The first pad stage initiates a fracture 212 in the target formation 204. The first pad stage is followed by a low permeability solids mixture phase to start bridging into the perimeter of the fracture edge 216. The solids mixture can pack into the perimeter of the fracture 216 causing the fracture length and height to stop propagating into the target formation 204 and the non-productive zones 206 and 208. The low-permeability solids mixture may include materials such as local sand or low quality or small mesh-sized, low permeability proppants. The low permeability solids may be used after pumping the first pad stage. Examples of low-permeability solids mixture include a mixture of 140, 120, 100, 80 and 70 mesh sand or proppant that are mixed together. For example, a solids mixture having a first proppant having particles within a range of 40-70 mesh sand or sintered bauxite, a second proppant including 45-80 mesh sand or sintered bauxite, a third proppant with 50-100 mesh sand or sintered bauxite, a fourth proppant 60-120 mesh sand or sintered bauxite, and a fifth proppant 70-140 mesh sand or sintered bauxite. The sand and sintered bauxite can be resin coated as well. In some cases, the mesh sizes of the proppant mixture can be in the range of 140-12 mesh. Appropriate mixtures of proppant can be determined in a lab by mixing solids with different mesh sizes and fibers then observe for the mixture that will yield impermeable results. As another example, non-uniformly crushed 70-40 sand or proppant can be used. The smaller and non-uniform particles can plug and pack the porosity reducing the permeability of the mixture. ununiformly distributed or crushed sand/sintered bauxite, resin coated sand, resin coated bauxite, ceramics, glass and plastics, degradable fiber, non-degradable fibers etc. The various materials may have particle sizes within the range of 105-1680 microns. The solids can be delivered into the target formations by being pumped along with any of the carrier fracture fluids such as water, linear gel, cross-linked gel, gelled oil, gelled acid, viscoelastic surfactants and foamed fluids.

The growth of the fracture height and width cannot be restricted due to reducing the pumping pressure of the fracturing treatment. The pumping pressure depends on several parameters including in-situ stress and tightness in the formation. Simply reducing the pumping rate may cause little to no injection of proppant into the fracture. In tight formations, the pressure required to fracture the formation can be significant. The pumping pressure of the fracturing stages has to exceed the fracture and extension pressures to create the fracture, and a sufficient pumping rate is provided to keep the fracture open and transport the proppant into the fracture. Failure to have sufficient pressure or pumping rate can lead to a premature screen out since the fracture width cannot accommodate the injected proppant. The pumping rate is maintained above the fracturing rate and pressure to keep the fracture open and transport the solids to the tip of the fracture edge avoiding premature screen out. The fracturing treatment is observed by monitoring the treatment parameters such as treating and bottomhole pressures and net pressure during the fracture treatment. An operator may use a Nolte-Smith plot to predict whether the fracture is being widened or if fracture height growth is occurring.

With the solids mixture introduced into the target formation 204, a pad is pumped into the target formation 204 via the same perforation zone 210 to grow the fracture 212 and to flush or distribute the solid mixture to a periphery 214 of the fracture 212. The sweep stage is continued until a desired fracture dimension is achieved. The initial pad is designed based on the target formation parameters such as in-situ stress profile, leak-off and reservoir temperature. The input parameters can be plugged into a fracturing simulator to predict the fracture geometry that can be achieved at the allowable pressures and rates. Similarly, the sweep stage can be simulated to displace the solids into the fracture edge and achieve the desired increase in fracture width and conductivity. A fracturing simulator can be used to determine the fracture dimensions.

Figure 3:
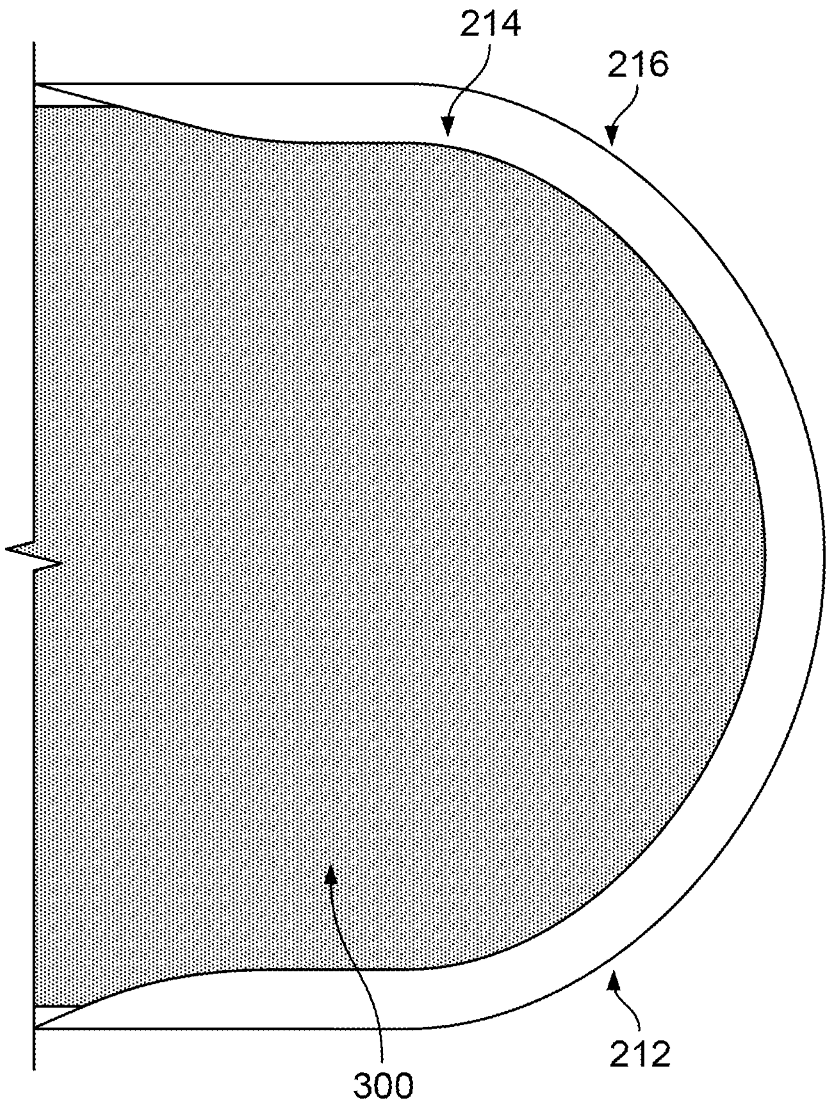
FIG. 3 is a detail view of a fracture formed in the formation of FIG. 2, according to some implementations of the present disclosure.

Introduction of the pad, referred to as a sweep stage, grows the fracture 212 radially toward, but not into, the adjacent non-productive zones 206 and 208. The function of the sweep stage is to distribute the solids mixture into the periphery 214, thereby inducing a physical barrier to stop or slow the growth of the fracture 212 radially. The swept solids mixture reduces stress applied to the fracture tip. As a result, the fracture develops a greater width, and the conductivity of the fracture 212 increases. FIG. 3 shows a detail view of the fracture 212, including the periphery 214 containing the solids mixture that forms an in-situ stress barrier. The in-situ stress barrier acts to limit radial expansion and fracture height growth of the fracture 212 during a main proppant fracturing stage. Particularly, the in-situ barrier operates to stop an increase in fracture height or slow a rate at which the height of the fracture increases. The solid mixture occupies the periphery 214 of the fracture 212, as shown in FIG. 3.

A main proppant fracture stage is commenced at the same perforation zone 210. As shown in FIG. 3, the main proppant fracture stage introduces and distributes a primary proppant 300 into the fracture 212. The primary proppant 300 holds open the fracture 212 to improve conductivity within the target formation 204. Further, the induced stress barrier formed at the periphery 214 by the solids mixture causes the main proppant fracture stage to widen the fracture.

Figure 4A:
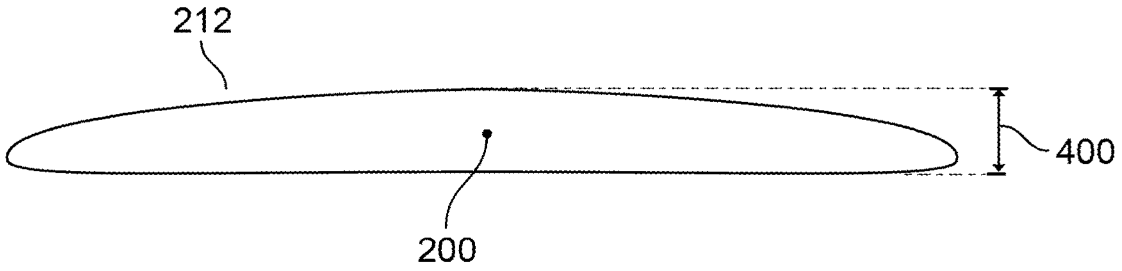
FIGS. 4A-4B are views of a fracture showing a fracture width, according to some implementations of the present disclosure.
Figure 4B:
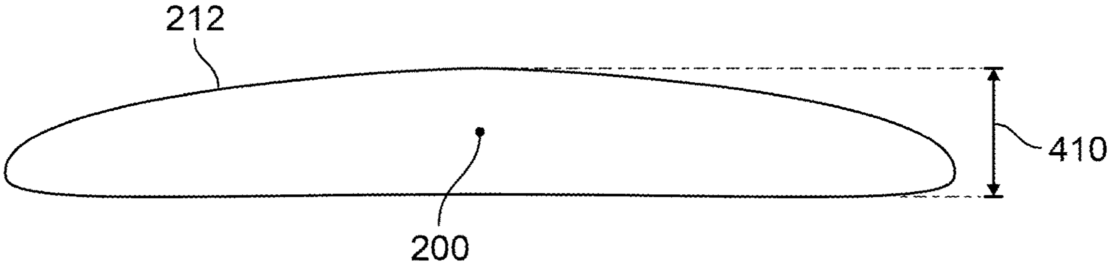

FIG. 4A illustrates a fracture width 400 of a fracture 212 in a target formation with no stress barriers. The fracture width 400 without the low permeability solids mixture packed into the periphery of the fracture is small. FIG. 4B illustrates a fracture width 410 of the fracture 212 after the low permeability solids mixture is packed into the periphery of the fracture 212. The sweep stage function is to displaces the solids into the edge of the fracture and keep the fracture open to receive the main proppants. The fracture width can be increased during the main proppant fracturing stage. In FIG. 4B, the fracture is widened in comparison to FIG. 4A The benefit of the sweep stage is to induce a physical barrier with the solids mixture to stop or slow the growth of the fracture 212 by reducing the stress applied to a fracture tip 216 (shown, for example, in FIG. 2B). As a result, the width 400 of fracture 212 grows to a greater extent. In other words, the introduction and sweep of the solids mixture changes the fracture behavior during the main proppant fracture stage from radial growth to growth similar to that experienced in a tip screen out mode. Consequently, the fracture 212 grows in width while having a somewhat radial shape, as shown in FIG. 3. With a greater width 400, the fracture 212 possesses a higher conductivity, which results in improved well productivity in comparison to a conventional radial fracture treatment applied to an unconfined target formation. Additionally, the fracturing treatments of the present disclosure also maintain the proppant introduced as part of the main proppant fracture stage within the target formation and outside of the non-productive zones bordering the target formation.

By establishing the in-situ stress barrier with the swept low permeability solids mixture, target formations lacking stress barriers may become economically feasible. By creating the in-situ stress barriers as described earlier, lower net fracturing pressures, less proppant use, less proppant loss (such as loss to non-productive zones), a reduced overall fracturing treatment, increased fracture width, and an overall lower cost can be achieved while increasing conductivity within the target formation.

Figure 5:
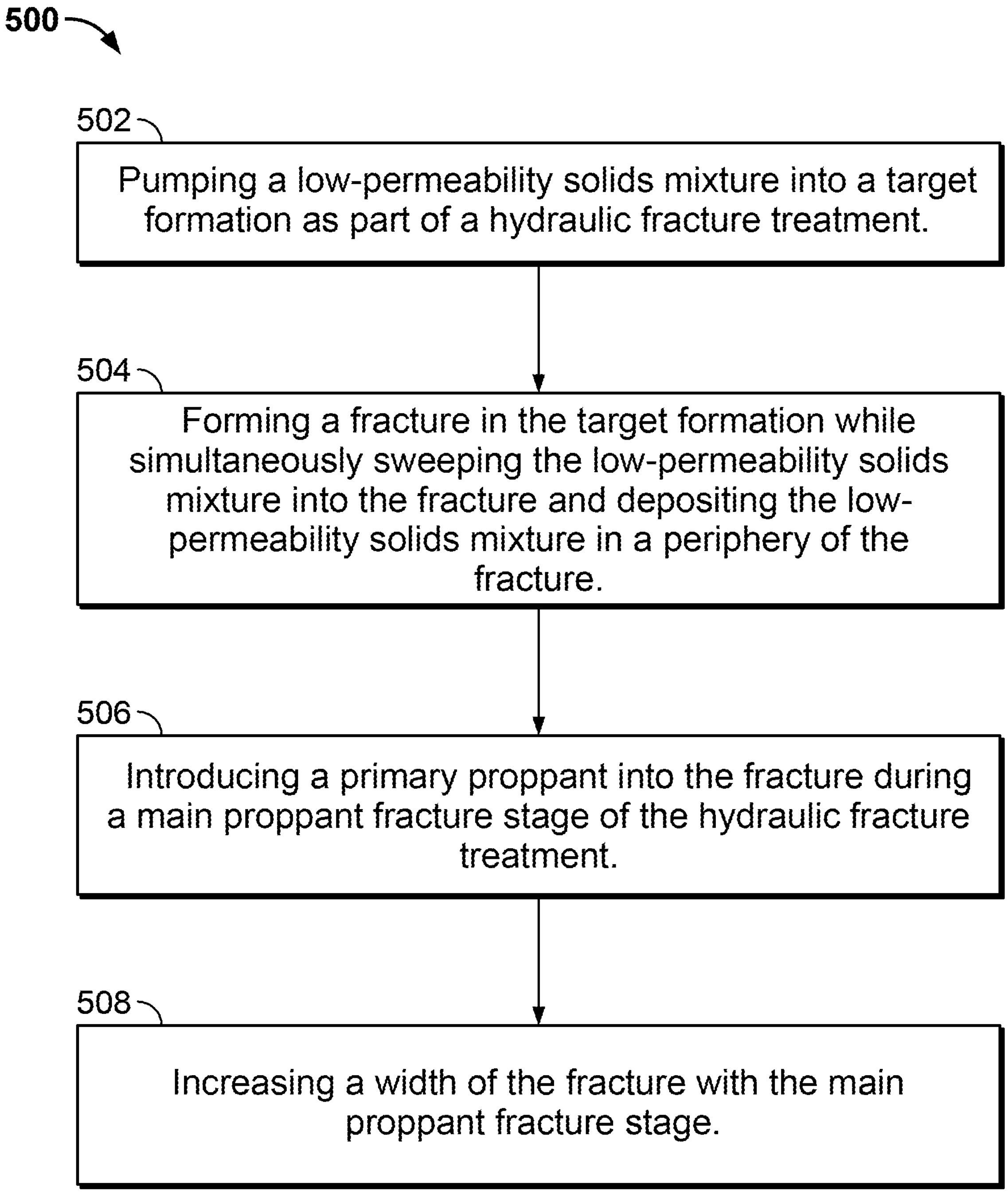
FIG. 5 is a flowchart of an example method for fracturing a formation lacking natural stress barriers, according to some implementations of the present disclosure.

FIG. 5 is a flowchart 500 of an example method for increasing a fracture width of a fracture formed in a target formation lacking natural stress barriers. At 502, a low-permeability solids mixture is pumped into a target formation as part of a hydraulic fracture treatment. The low-permeability solids mixture may include a sand sourced near a well site or a low quality, low permeability proppant. At 504, a fracture is formed in the target formation while the low-permeability solids mixture is simultaneously swept into the fracture. The low-permeability solids mixture is deposited in a periphery of the fracture. The fracture and sweep of the low-permeability solids mixture may be performed with a pad. Further, the fracture is grown to a desired dimension. In some instances, introduction of the low-permeability solids mixture, distribution of the mixture, and formation of the fracture may be performed in a single stage of the fracturing treatment. At 506, a primary proppant is introduced into the fracture during a main proppant fracture stage of the hydraulic fracture treatment. The primary proppant operates to maintain opening of the fracture. Additionally, at 508, the main proppant fracture stage increases the width of the fracture in comparison to traditional treatments while limiting growth in the fracture height due to the in-situ stress barrier induced by the low-permeability solids mixture.

FIG. 6 is a table 520 showing an example pumping schedule that could be used according to some implementations of the present disclosure. The first stage of the pumping schedule 522 comprises the introduction of low permeability solids into the target formation and comprises four steps that are executed consecutively. The first step 524 pumps a pad of cross-linked gel with a gel concentration of 40 lbm per 1000 gallons and containing no proppant. The second step 526 pumps a 40 lbm per 1000 gal cross-linked gel mixture with 0.5 pounds of 40/70 sand proppant added per gallon (ppa). The specific gravity of the 40/70 sand is 2.65. The third step 528 pumps a cross-linked gel mixture with the proppant concentration increasing to 1.0 ppa of 40/70 sand. The fourth step 530 of the first stage 522, increases the proppant concentration to 2.0 ppa of 40/70 sand. This first stage 522 takes a total of 48.95 minutes to complete.

The second stage of the procedure 532 comprises the main fracturing stage and immediately follows the end of the preceding step 530. The second stage 532 commences with pumping a pad with no added proppant. Proppant is added in the second step 534 of the second stage 532 at a concentration of 0.5 ppa of 30/50 high-quality proppant sand. The 30/50 proppant having a specific gravity of 3.61. The succeeding steps increase the proppant concentration by 0.5 ppa per step. Starting at the fourth step 536, the concentration of the gel is reduced to 35 lbm per 1000 gal for the cross-linked gel and the proppant concentration has increased to 2.0 ppa and continues increasing by 0.5 ppa in succeeding steps. This gel concentration is maintained through the ninth step 541 where the proppant concentration has increased to 4.5 ppa. The tenth step 542 of this stage 532 is a flush with a linear gel having a concentration of 15 lbm per 1000 gal and no proppant. The duration of this main fracture stage 532 is 80.70 minutes resulting in a total duration for the procedure of 129.65 minutes.

Figure 7B:
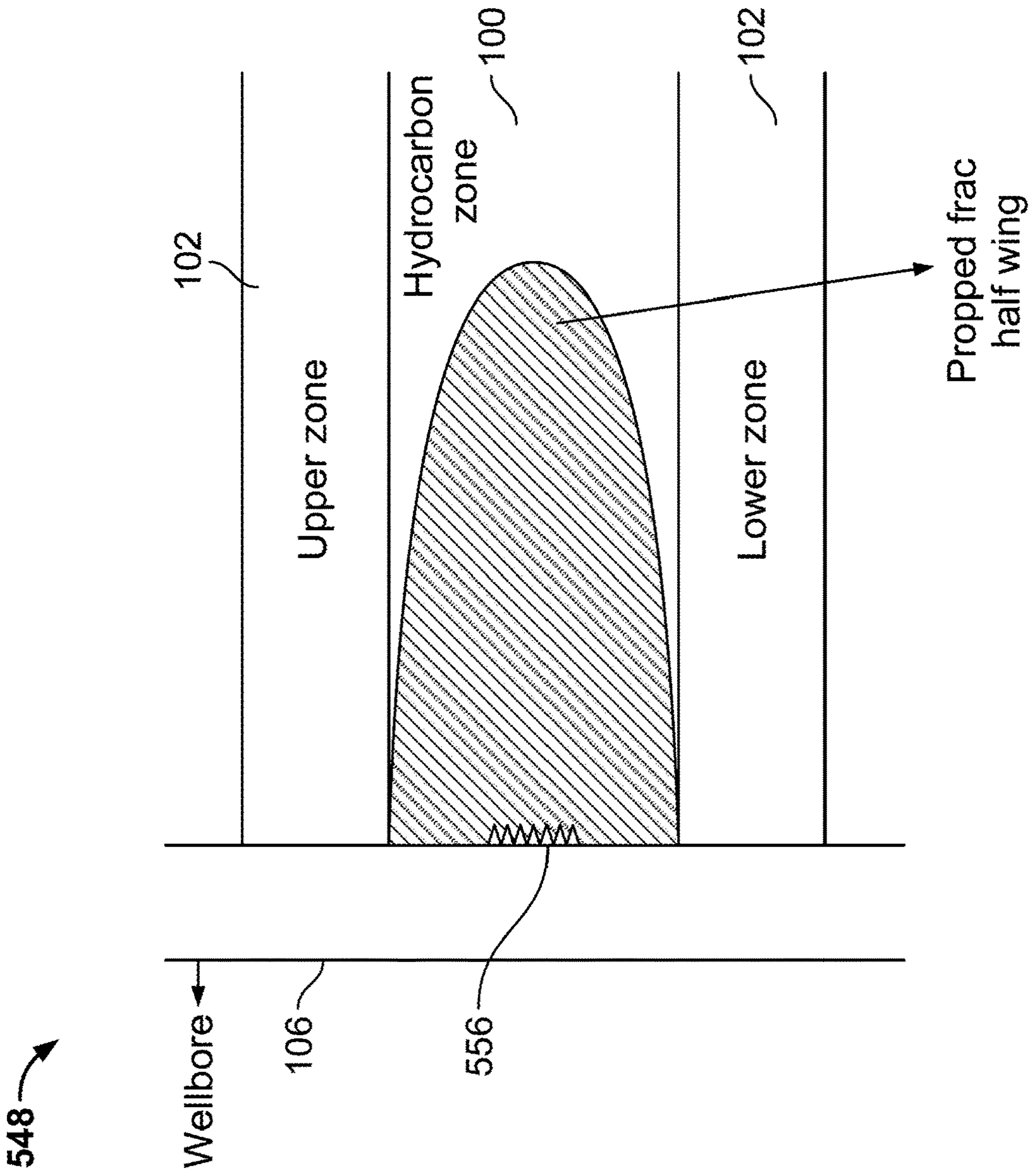
FIGS. 7A-7B are cross-sectional views of a formation bounded by stress barriers and a corresponding stress profile of the formation, according to some implementations of the present disclosure.
Figure 7A:
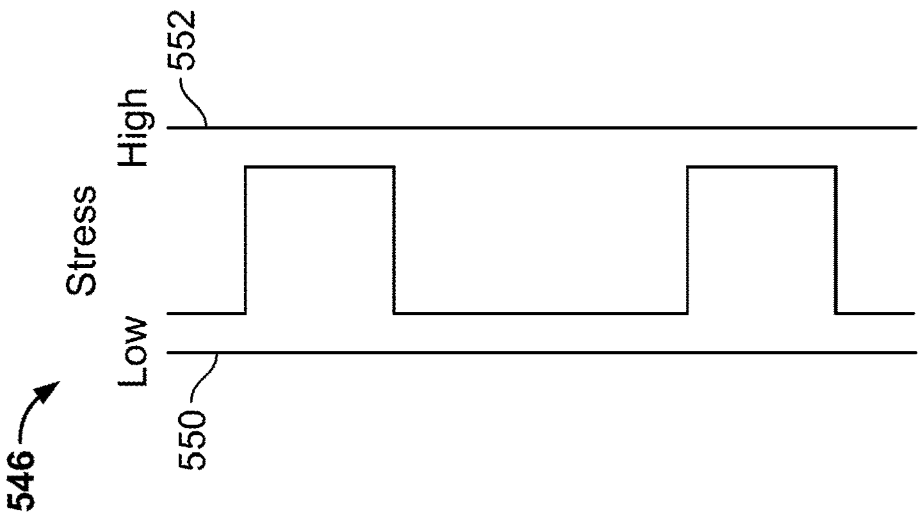

FIG. 7A shows an example stress profile 546 of a formation 548 wherein the target hydrocarbon zone 100 has low stress 550 and adjacent regions 102 have high stress 552. FIG. 7B shows a cross-sectional view of the formation 548 with a propped fracture half wing 554 in the target hydrocarbon formation 100. The target formation 100 being bounded by high stress barriers 102 above and below. A vertical well 106 extends through the target formation 100 and stress barriers 102. A perforation zone 556 is shown in the well 106 within the target hydrocarbon zone 100. The stress contrast between the adjacent high stress regions 102 and the target formation 100 contain the fracture growth allowing the fracture width to be increased and packed with proppant providing a likelihood of good fracture conductivity.

Figure 8A:
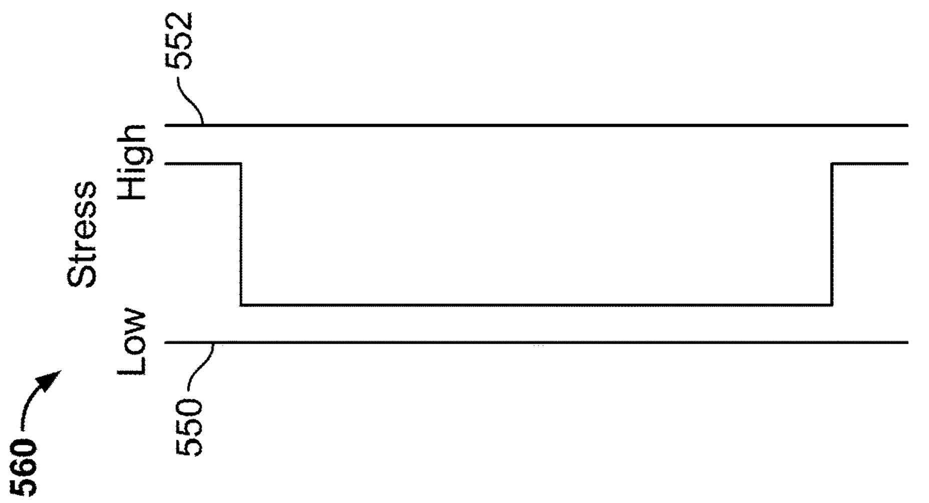
FIGS. 8A-8B are cross-sectional views of a fracture in a formation lacking natural stress barriers and a corresponding stress profile of the formation, according to some implementations of the present disclosure.
Figure 8B:
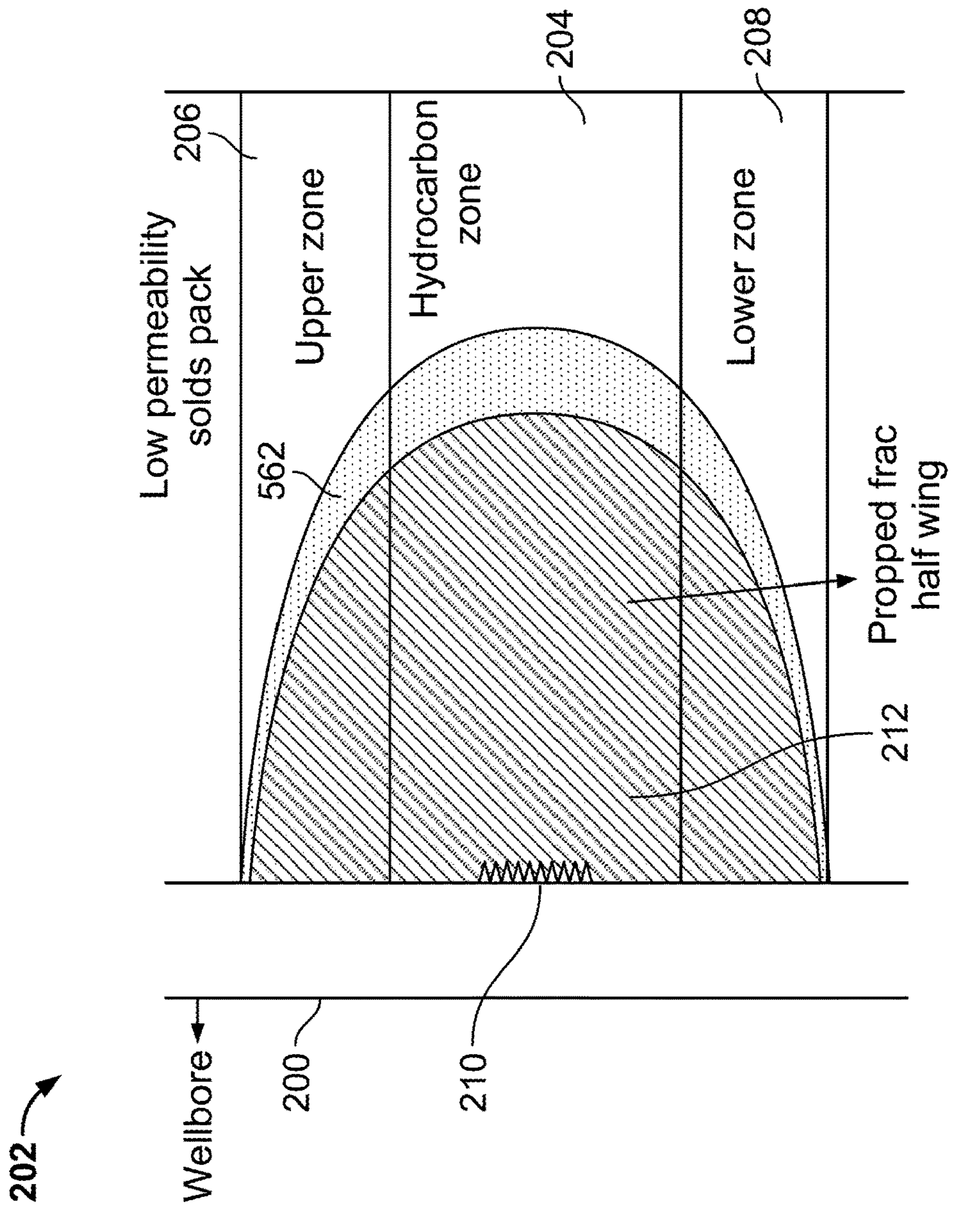

FIG. 8A shows an example stress profile 560 of a formation 202 wherein the target hydrocarbon zone 204 has low stress 550 and adjacent regions above 206 and below 208 also have low stress 550 thus lacking natural stress barriers between the target hydrocarbon zone and the adjacent non-productive zones. FIG. 8*b* shows a cross-sectional view of the formation 202 treated in accordance with some implementations of the present disclosure. The treatment being introduced to the formation through the perforated zone 210 of the well 200 according to the method 500. A layer of low permeability solids 562 having been swept to the periphery of the fracture 212 reduces the radial growth of the fracture 212 into the adjacent non-productive zones during the main fracturing treatment. The width of the fracture 212 can be increased during the main fracturing treatment due to the in-situ dynamic stress barrier imposed by the layer of low permeability solids 562. The main fracture 212 can be packed with high-permeability proppant allowing higher likelihood of good conductivity than without an approach of the present disclosure.

Figure 9B:
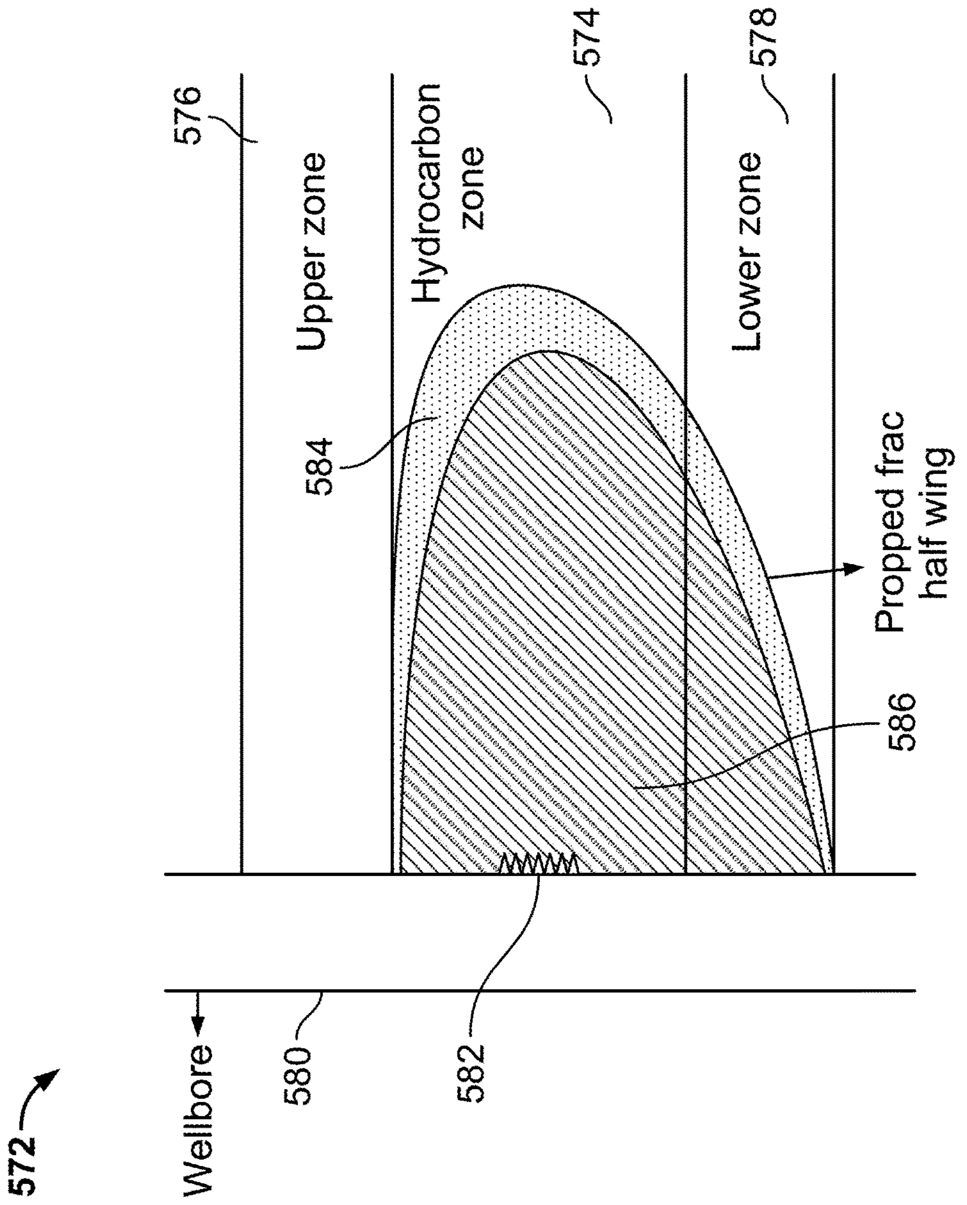
FIGS. 9A-9B are cross-sectional views of a fracture in a formation with a natural stress barrier bounding the top of the formation and lacking a stress barrier below the formation and a corresponding stress profile of the formation, according to some implementations of the present disclosure.
Figure 9A:
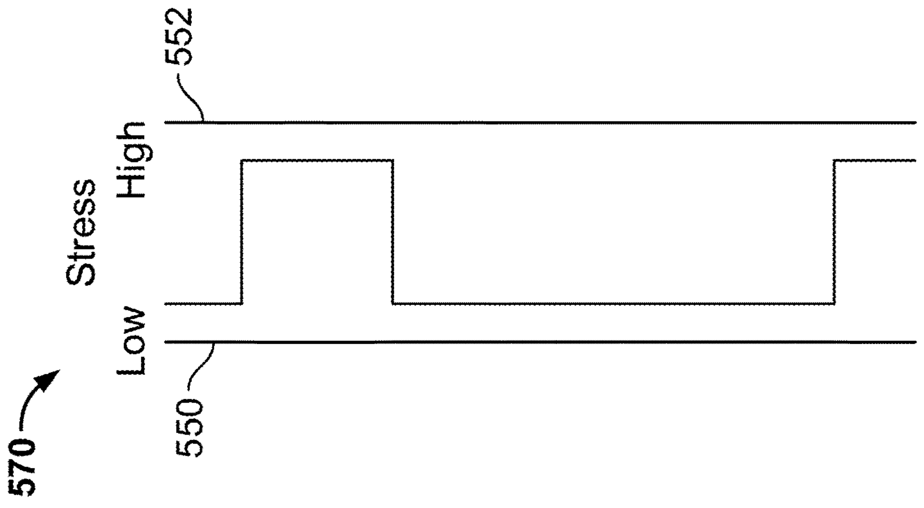

FIG. 9A shows an example stress profile 570 of a formation 572 wherein the target hydrocarbon zone 574 has low stress 550 and a first non-productive zone 576 above the target formation 574 has high stress 552 while a second non-productive zone 578 below the target formation 574 has low stress 550. FIG. 9B shows a cross-sectional view of the formation 572. A vertical well 580 extends through the first non-productive zone 576, the target formation 574, and the second non-productive zone 578. A perforation zone 582 in the well 580 extends a length within the target formation 574. A hydraulic fracturing treatment is applied through the perforated zone 582 according to an implementation of the present disclosure. A layer of low permeability solids 584 having been swept to the periphery of the fracture 586 reduces the radial growth of the fracture into the low stress non-productive zone 578 defining an in-situ dynamic barrier. During the main fracturing treatment, the width of the fracture 586 is increased and packed with high-permeability proppant allowing a likelihood of higher conductivity than without an approach of the present disclosure.

Figure 10B:
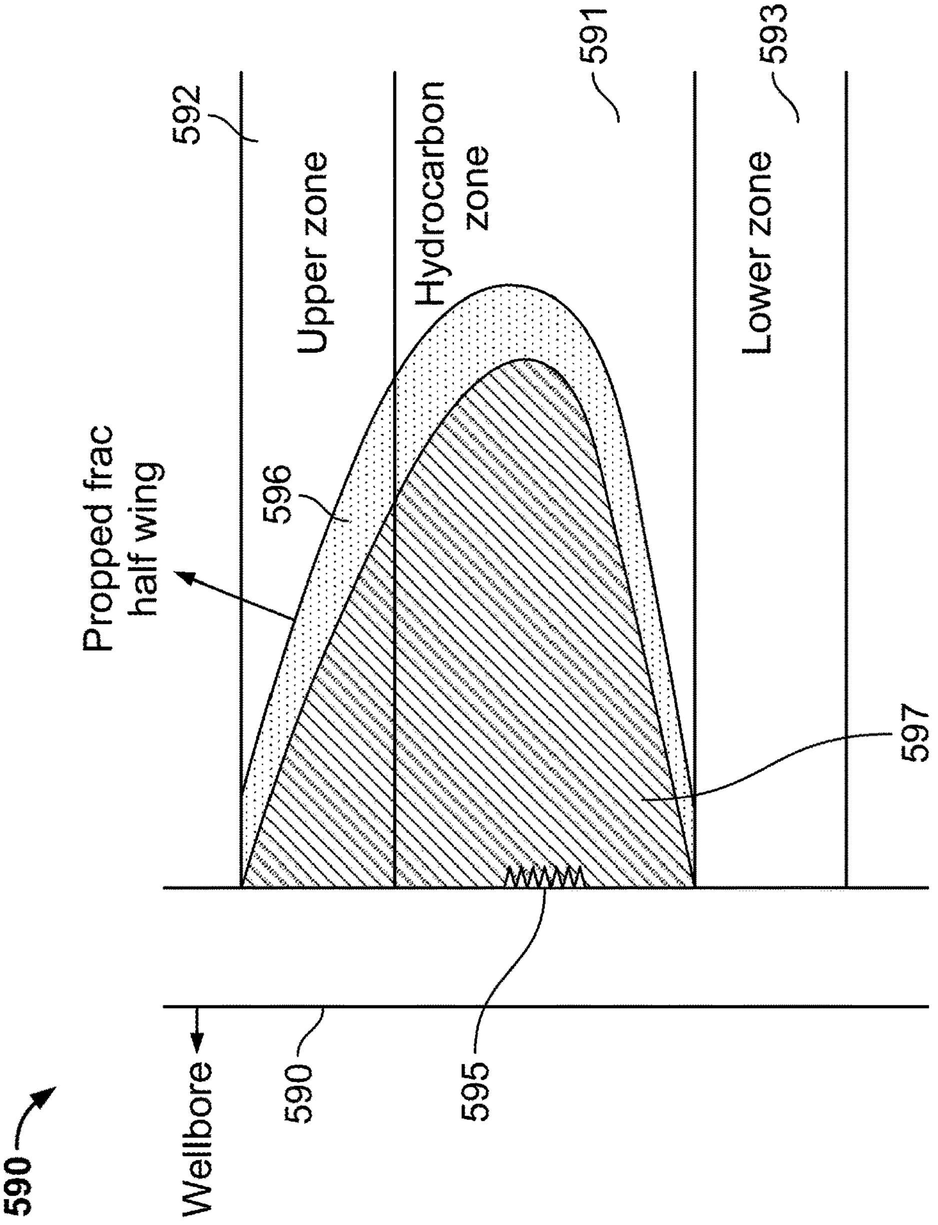
FIGS. 10A-10B are cross-sectional views of a fracture in a formation lacking natural stress barriers above the formation and bound by a stress barrier below the formation and a corresponding stress profile of the formation, according to some implementations of the present disclosure.
Figure 10A:
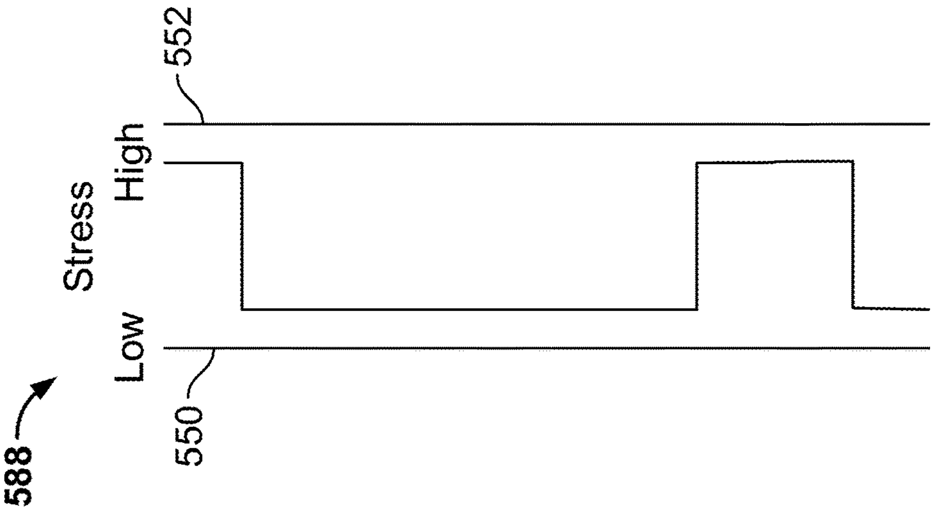
Figure 11:
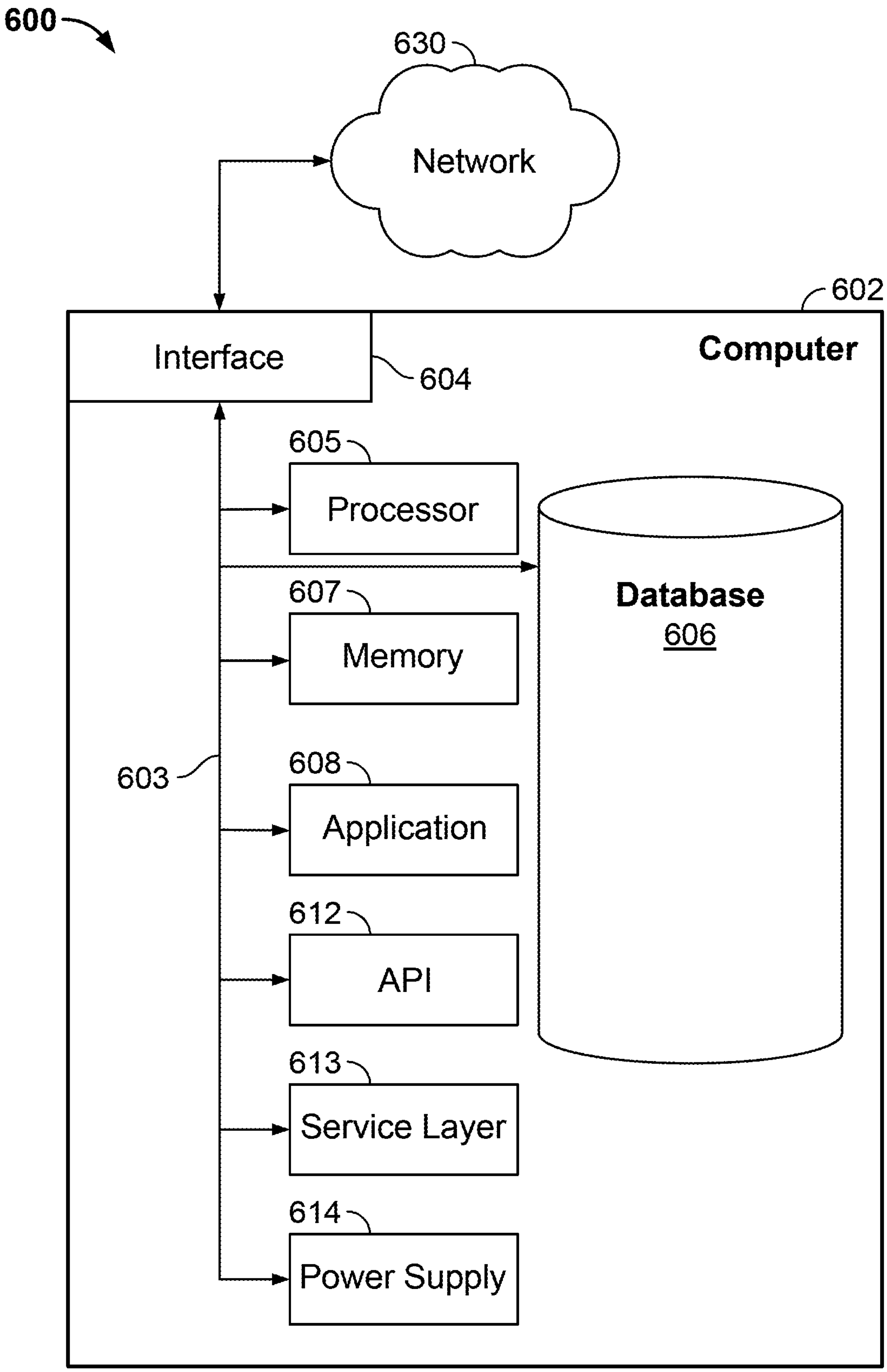
FIG. 11 is a block diagram of an example computer system used to provide computational functionalities associated with described algorithms, methods, functions, processes, flows, and procedures described in the present disclosure, according to some implementations of the present disclosure.

FIG. 10A shows an example stress profile 588 of a formation 590 wherein the target hydrocarbon zone 591 has low stress 550 and a first non-productive zone 592 above the target hydrocarbon zone 591 has low stress 552 while a second non-productive zone 593 below the target hydrocarbon zone 591 has high stress 552. FIG. 10B shows a cross-sectional view of the formation 590. A vertical well 594 extends through the first non-productive zone 592, the target formation 591, and the second non-productive zone 593. A perforation zone 595 in the well 594 extends a length within the target formation 591. A hydraulic fracturing treatment is applied through the perforated zone 582 according to an implementation of the present disclosure. A layer of low permeability solids 596 having been swept to the periphery of the fracture 597 reduces the radial growth of the fracture into the low stress non-productive zone 592 defining an in-situ dynamic barrier. During the main fracturing treatment, the width of the fracture 597 is increased and packed with high-permeability proppant allowing a likelihood of higher conductivity than without an approach of the present disclosure.

A number of implementations of the present disclosure have been described. Nevertheless, it will be understood that various modifications may be made without departing from the spirit and scope of the present disclosure. For example, the fracturing treatments described earlier may be performed simultaneously or simultaneously at two or more locations within the target formation or in the target formation and a second formation different from the target formation. Accordingly, other embodiments are within the scope of the following claims.

What is claimed is:

1. A method for increasing a fracture width of a hydraulic fracture formed in a target formation lacking natural stress barriers, the method comprising:

introducing a solids mixture into the target formation via a well to form an impermeable barrier by applying a first hydrostatic pressure, the solids mixture comprising sand or proppant having a first size;

introducing a pad into the target formation via the well;

forming a fracture in the target formation and distributing the solids mixture into the target formation with the injected pad, the solids mixture interacting with the target formation to change a localized permeability of the target formation at a peripheral edge of the fracture and limiting a height of the fracture;

introducing a primary proppant into the fracture via the well; and enlarging a width of the fracture with the introduction of the primary proppant into the fracture by applying a second hydrostatic pressure greater than the first hydrostatic pressure, the primary proppant having a second size that is greater than the first size, the primary proppant maintaining the fracture in an open condition.

2. The method of claim 1, wherein the solids mixture, the pad, and the primary proppant are introduced into the target formation at the same location within the well.

3. The method of claim 1, further comprising perforating an interval of the well at a location along the well.

4. The method of claim 3, wherein the solids mixture, the pad, and the primary proppant are introduced into the target formation at the perforated interval of the well.

5. The method of claim 1, wherein the solids mixture comprises a secondary proppant having a mesh size within a range of 140-12 mesh.

6. The method of claim 1, wherein the solids mixture comprises a non-uniformly crushed proppant or sand having a mixture of sizes that when packed reduce a permeability of the solids mixture.

7. The method of claim 1, wherein the primary proppant includes at least one of 70/40 mesh sand, 70/40 mesh sintered bauxite, 30/50 mesh sand, 30/50 mesh sintered bauxite, 20/40 mesh sand, 20/40 mesh sintered bauxite, 16/30 mesh sand and 16/30 mesh sintered bauxite.

8. The method of claim 7, wherein the sand and sintered bauxite are resin coated.

9. The method of claim 1, wherein the primary proppant comprises a natural sand or proppant with a mesh size between 30 and 50.

10. The method of claim 1, wherein the target formation comprises a formation lacking natural stress barriers at one or more boundaries of the target formation.

11. The method of claim 1, wherein the pad has no proppant.

12. The method of claim 1, wherein introducing the solids mixture comprises multiple stages, wherein each stage comprises a higher concentration of the solids mixture than a preceding stage.

13. The method of claim 1, further comprising fracturing the formation by introducing an initial pad into the target formation before introducing the solids mixture.

14. The method of claim 13, wherein introducing the solids mixture comprises applying a hydrostatic pressure greater than a hydrostatic pressure applied when introducing the initial pad.

15. The method of claim 1, further comprising after enlarging the fracture width, flushing the fracture with a linear gel without added solids or proppants.

* * * * *